United States Patent
Iyer

(10) Patent No.: US 10,693,825 B2
(45) Date of Patent: Jun. 23, 2020

(54) SYSTEMS AND METHODS FOR EDITING, RECALLING, AND DELETING MESSAGES

(71) Applicant: T-Mobile USA, Inc., Bellevue, WA (US)

(72) Inventor: Karthik Iyer, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/001,606

(22) Filed: Jun. 6, 2018

(65) Prior Publication Data

US 2019/0379622 A1 Dec. 12, 2019

(51) Int. Cl.
| | | |
|---|---|---|
| H04W 4/00 | (2018.01) | |
| H04L 12/58 | (2006.01) | |
| H04L 29/06 | (2006.01) | |
| H04W 8/04 | (2009.01) | |

(52) U.S. Cl.
CPC ............ H04L 51/18 (2013.01); H04L 51/04 (2013.01); H04L 65/1006 (2013.01); H04L 65/1016 (2013.01); H04W 8/04 (2013.01)

(58) Field of Classification Search
CPC ..... H04L 51/18; H04L 51/04; H04L 65/1006; H04L 65/1016; H04W 8/04
See application file for complete search history.

(56) References Cited

U.S. PATENT DOCUMENTS

| | | | |
|---|---|---|---|
| 2010/0138507 A1* | 6/2010 | Sun | ........................ H04L 51/04 709/206 |
| 2011/0047222 A1 | 2/2011 | Farrell et al. | |
| 2013/0219296 A1 | 8/2013 | Thazhmon et al. | |
| 2014/0189532 A1 | 7/2014 | Sivaraman | |
| 2015/0378520 A1* | 12/2015 | Chandrasekaran | ... G06F 3/0482 715/716 |
| 2016/0014574 A1 | 1/2016 | Christmas et al. | |
| 2017/0048180 A1* | 2/2017 | Kim | ...................... G06Q 50/30 |
| 2018/0130022 A1* | 5/2018 | Ayoub | .................... H04L 51/02 |

FOREIGN PATENT DOCUMENTS

WO WO02098082 12/2002

OTHER PUBLICATIONS

PCT Search Report and Written Opinion for Application No. PCT/US2019/034112, dated Sep. 18, 2019, 11 pages.

* cited by examiner

*Primary Examiner* — Barry W Taylor
(74) *Attorney, Agent, or Firm* — Lee & Hayes, P.C.

(57) ABSTRACT

Systems and methods for enabling messages to be modified are disclosed. The system can enable messages that have already been sent, and even messages that have already been read, to be edited, recalled, or deleted. The system can identify incoming messages with message identifications (IDs) that are associated with previously sent or received messages, or "stored" messages, and modify the stored messages according to the content of the incoming messages. The system can include new SIP headers including X-EDIT-MessageID, X-RECALL-MessageID, and X-DELETE-MessageID. When an incoming message is received with a message ID associated with a stored message and/or one of the new commands, the receiving user equipment (UE) can replace the contents of the stored message with the contents of the incoming message or recall or delete the stored message.

20 Claims, 7 Drawing Sheets

SYSTEMS AND METHODS FOR EDITING, RECALLING, AND DELETING MESSAGES

BACKGROUND

Short messaging service (SMS) and multimedia messaging service (MMS), often referred to simply as "text messaging," is a very popular form of communication. With SMS, users can send a message up to 140 characters long (or longer messages broken into 140 character parts), which is received by the recipient usually within seconds. Text messages can be useful when a voice call is not possible, for example, because one of the users (the sender or the recipient) is at work, in a meeting, or otherwise unavailable.

The addition of multimedia messaging service (MMS) has enabled users to include photos, emojis, and other types of media in messages, further enhancing the service. Users can now take a picture with their camera phone, for example, and then send the picture and a caption in an MMS to one or more recipients. And, while an MMS provides additional capabilities, it still functions in substantially the same user-friendly way as an SMS message.

One drawback to current SMS and MMS messages, however, is that, once they are sent, they cannot be edited, recalled, or deleted. So, if a user misspelled a word in a message, for example, they may send another message simply to correct the spelling of one word. Worse, users can sometimes inadvertently send a message to the wrong recipient, which cannot then be recalled or deleted. Obviously, some messages intended for friends or loved ones might reveal confidences or be embarrassing if accidentally sent to the wrong recipient.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
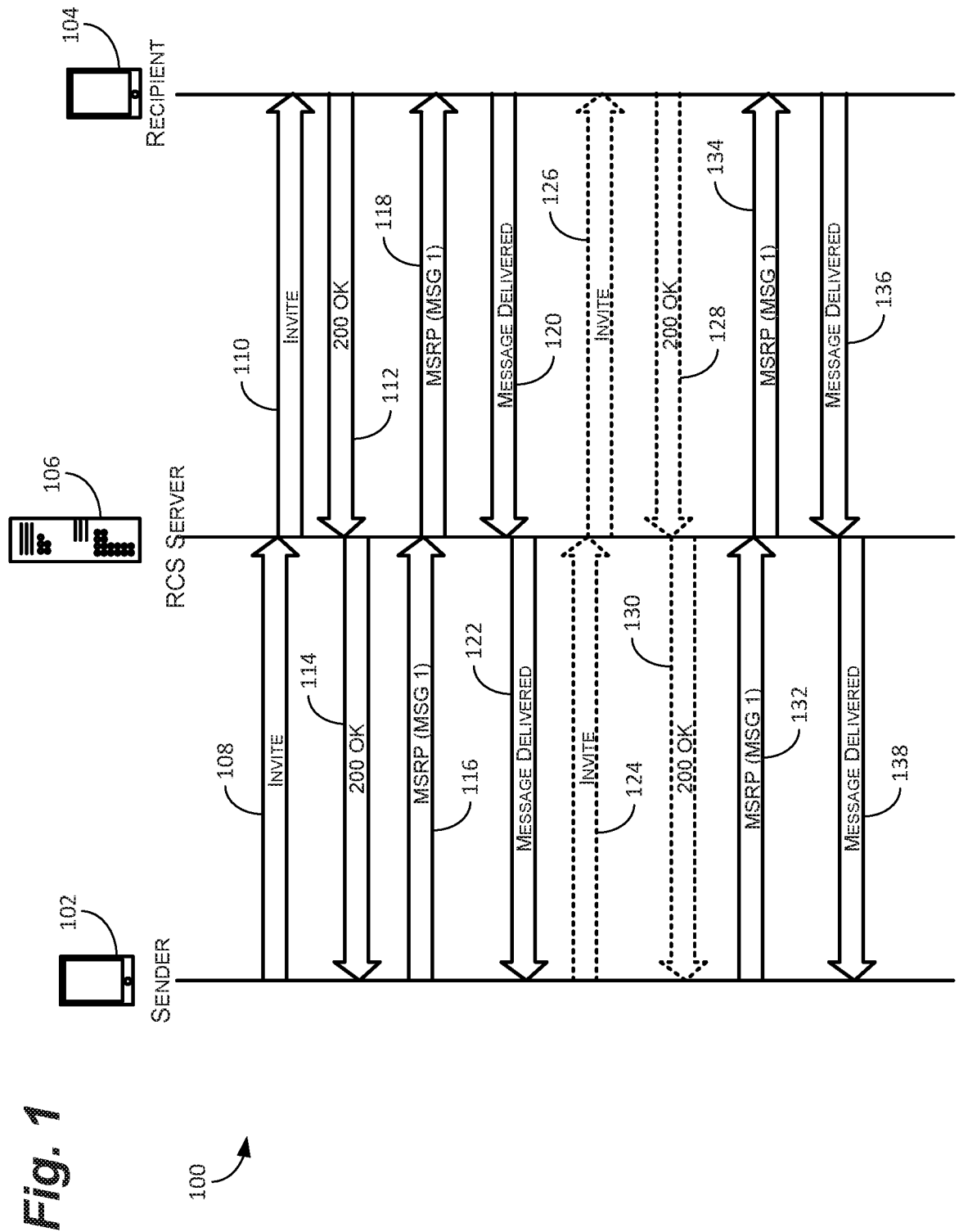
FIG. 1 is a flowchart that depicts an example of a session based method for sending, receiving, and modifying messages, in accordance with some examples of the present disclosure.

Examples of the present disclosure can comprise systems and methods for editing, recalling, and deleting messages after they have been sent. In some examples, new session initiation protocol (SIP) messages can enable messages to be edited and deleted, even after they have been delivered and, in some cases, in real-time. The system can be session-based and can edit or delete messages via a message session relay protocol (MSRP) server. If the session is still active for the messaging between the user and the recipient, for example, the system can utilize the existing session. Otherwise, a new session can be established. In other examples, the system can send standalone SIP messages including the message ID for the target message and instructions to either delete the message or edit it.

For clarity, short messaging service (SMS), multimedia message service (MIMS), rich communications services, video messages, and other types of messaging are simply referred to herein as, "messages." The systems and methods described herein are applicable to any of these types of messages that use internet protocol (IP) and MSRP or SIP messaging to operate. The system is also described below for use with current technology networks (e.g., 4G LTE networks). One of skill in the art will recognize, however, that similar solutions could be used for editing messages on 5G, Internet of Things (IoT), machine-to-machine (M2M), and even future network technologies that have yet to be invented. Thus, the use of 2G, 3G, and 4G LTE in the examples below is simply a reflection of current technologies and is not meant to limit the application. Indeed, one of ordinary skill in the art will see that the system could also be used, with little or no modification, with online instant messaging and other messaging services.

As mentioned above, while convenient, text, and other, messages have one major drawback—once the user hits the send button, the message generally cannot be edited, recalled, or deleted. So, for example, a user types a message, "I am stopping at the grocery store fir milk, do you need anything?" and hits send. The user then notices that they misspelled "for" as "fir." Because messages, for example, cannot currently be edited after sending them, however, common practice is to send another message that simply says, "for". And, while the recipient probably understood the message anyway, this technology nonetheless results in additional messages being sent.

Standard Session Initiated Protocol (SIP) session based messaging using the Message Session Relay Protocol (MSRP), however, does not have a provision for replacing or editing messages. During an MSRP session, each message includes information such as, for example, to, from, conversation ID, contribution ID, etc. Each message also includes a message ID, however, the message ID for each subsequent message is different and random. Because of this, after the message is delivered, the message ID is no longer utilized, other than some rudimentary functions such as deduplication (i.e., ensuring the message is not a duplicate of one previously received). There is currently no ability, however, to edit previous messages, only send new ones.

SIP standalone messaging uses the "MESSAGE" command to send messages. And, while the message also contains a message ID, the message ID is also not used after the message is delivered to, for example, edit, recall, or delete messages. This is because there is no SIP command that references the previous message ID (e.g., REPLACE, RECALL, DELETE, etc., as discussed below). As a result, under the current SIP (session based and standalone based) protocol, once a SIP message is sent, it cannot be modified.

It would be useful to be able to simply edit the first message in the example above to change "fir" to "for." In addition, if the message was meant for your wife, but you sent it to a friend, for example, it would also be useful to be able to delete or recall the message to avoid confusion. If the session created to send the message in the first place is still active, it would also be useful to use the same session to edit, delete, or recall the message to reduce signaling overhead. It is to such systems and methods that examples of the present disclosure are directed.

As shown in FIG. 1, in some examples, the method 100 can be session based. In this configuration, the method 100 can use a rich communications services server (RCS—shown) or other server to enable editing, recalling, and/or deleting messages using MSRP messaging. In this case, however, the message ID can be used to edit, recall, or delete messages.

FIG. 1 depicts messaging between a user equipment (UE) of a sender 102 and the UE of a recipient 104 via an RCS server 106. The UEs 102, 104 can be any type of electronic device capable of sending various types of messages including, but not limited to, cell phones, smart phones, tablet computers, and laptop computers. For ease of explanation, the message is shown going straight from the sender UE 102 to the RCS server 106 to the recipient UE 104. One of skill in the art will recognize that, in reality, messaging can involve several additional network entities such as, for example, a home subscriber service (HSS) and/or a third-generation partnership project authentication, authorization, and accounting (3GPP AAA) server, which are discussed below in more detail with reference to FIGS. 4 and 5.

At 108, the sender UE 102 can send an "INVITE" to the recipient 104 via the RCS server 106 to initiate an MSRP session with the recipient UE 104. The invite can include, for example, the phone number or IP address of the sender (from), the phone number or IP address of the recipient (to), the conversation ID, contribution ID, user agent (UA), call ID, etc. The INVITE is used to establish the initial MSRP session for messaging. At 110, the INVITE can be sent from the RCS server 106 to the recipient UE 104 for acceptance.

At 112, if the recipient UE 104 is willing and able to open the session, the recipient UE 104 can send an acknowledgement such as a SIP "200 OK". 200 OK indicates that the request to establish the session was successful. At 114, the RCS server 106 can relay the 200 OK to the sender UE 102 to inform the sender UE 102 that the session has been established.

Now that the session has been established, at 116, the sender UE 102 can send a first MSRP message to the RCS server 106 addressed to the recipient UE 104. The first message can include text, images, video and/or other media. Notably, the first message also includes the message ID, in this case MSG 1. At 118, the RCS server 106 can relay the first message to the recipient UE 104. If the recipient UE 104 received the message successfully, then at 120, the recipient UE 104 can send another acknowledgement. To avoid confusion, MESSAGE DELIVERED is used herein and shown in FIG. 1. At 122, the RCS server 106 can relay the MESSAGE DELIVERED response to the sender UE 102. An example of this exchange is shown below:

```
MSRP sd678hg5 SEND
To-Path: msrp://recipient.example.com:12763/kjhd37s2s20w2a;tcp
From-Path: msrp://sender.example.com:7654/jshA7weztas;tcp
Message-ID: MSG 1
Byte-Range: 1-25/25
Content-Type: text/plain
I am stopping at the grocery store fir milk, do you need anything?
-------sd678hg5$
MSRP a786hjs2 200 OK
To-Path: msrp://sender.example.com:7654/jshA7weztas;tcp
From-Path: msrp://recipient.example.com:12763/kjhd37s2s20w2a;tcp
------sd678hg5
```

Using conventional MSRP technology, when the sender UE 102 receives the MESSAGE RECEIVED, the system is "done" with this particular message. In other words, the message, and the message ID, are no longer used by the network (though they may be stored in the message histories of the UEs 102, 104). The message has been sent and cannot be altered. A second message, therefore, uses a second message ID—e.g., MSG 2—while MSG 1 is used in the four preceding steps 116, 118, 120, 122 and then is not used again. Using the method 100 described herein, however, the user can use the message ID to edit, recall, or delete the message.

In the session-based configuration, the next step is based on whether the initial session is still active. Generally, once established, the session will remain open as long as there is active messaging. If there is a lull in messaging that exceeds some predetermined time (e.g., 2 or 3 minutes) then the session is automatically ended and must be reestablished. At 124, therefore, when the session has ended, the sender UE 102 can send a second INVITE to the RCS server 106 to establish a new session. As before, the invite can include, for example, to, from, the conversation ID, contribution ID, user agent (UA), call ID, and other fields. At 126, the second INVITE can be sent to the recipient UE 104 for acceptance.

At 128, if the recipient UE 104 is willing and able to open a new session, the recipient UE 104 can send a 200 OK. Again, 200 OK indicates that the request to establish the second session was successful. At 130, the RCS server 106 can relay the 200 OK to the sender UE 102 to inform the sender UE 102 that the session has been established. In FIG. 1, these steps 124, 126, 128, 130 are shown in dotted lines because they need not be repeated if the session is still active. If the session is still active, the sender UE 102 can simply send the second message, at 132, as discussed below.

Referring back to the example above—and regardless of whether the session is still active or has been reestablished—when the user realizes that they have misspelled "for," in the first message, the user can reselect the first message to edit it. Using a touchscreen phone, for example, the user may simply touch and hold the screen where the first message is displayed in the messaging application until a drop-down menu appears. Conventionally, the drop-down menu might include, for example, "copy" or "forward". This only copies the content of the message, however, for inclusion in a second message with a second message ID. In the present case, however, the method 100 can edit, recall, or delete the first message. To this end, edit, recall, and/or delete can be added to the drop-down menu. Of course, different UE and different operating systems (OS) can provide this feature in different ways and using different inputs and outputs.

When the user has finished editing the message, the user can hit send again to send the second message. At 132, the sender UE 102 can send the second message back to the RCS server 106. Editing the message using MSRP can be achieved in at least two ways. In the first example, the recipient UE 104 knows to edit the message based solely on the repeated message ID (MSG 1):

```
MSRP bf5676lk SEND
To-Path: msrp://recipient.example.com:12763/kjhd37s2s20w2a;tcp
From-Path: msrp://sender.example.com:7654/jshA7weztas;tcp
Message-ID: MSG 1
Byte-Range: 1-25/25
Content-Type: text/plain
I am stopping at the grocery store for milk, do you need anything?
-------bf5676lk$
MSRP a786hjs2 200 OK
To-Path: msrp://sender.example.com:7654/jshA7weztas;tcp
From-Path: msrp://recipient.example.com:12763/kjhd37s2s20w2a;tcp
    ------bf5676lk
```

Note that the second message may have a new transaction ID (bf56761k), since it is actually a different message, but it has the same message ID (MSG 1). In this case, the second message also contains the corrected text correcting "fir" to "for". As discussed below, the recipient UE can then determine that the message ID for the second message is associated with the first message. This, in turn, indicates the need to modify the first message, instead of displaying the second message (as would normally occur).

In the second example, the method 100 can use a new SIP header to modify the first message. Thus, the SIP INVITE message can include one of several new commands including, for example, X-EDIT-MessageID, X-RECALL-MessageID and X-DELETE-MessageID. In this example, the sender UE 102 can use the edit feature to correct the initial message:

```
========== SIP SESSION REQUEST ================= INVITE
sip:receiver@example.com SIP/2.0
To: <sip:receiver@example.com>
From: <sip:sender@example.com>
Call-ID: 87295gh4980w8NB
Content-Type: application/sdp
c=IN IP6 example.com
m=message 7654 TCP/MSRP *
a=accept-types:text/plain
a=path:msrp://example.com:7654/kalhjg6sjkhgs;tcp
X-EDIT-MessageID: MSG 1
    ===============MSRP SESSION ========================
    MSRP fghy678j SEND
    To-Path: msrp://recipient.example.com:12763/kjhd37s2s20w2a;tcp
    From-Path: msrp://sender.example.com:7654/jshA7weztas;tcp
    Message-ID: MSG 1
       Byte-Range: 1-25/25
       Content-Type: text/plain
       I am stopping at the grocery store for milk, do you need anything?
    -------fghy678j $
    MSRP a786hjs2 200 OK
    To-Path: msrp://sender.example.com:7654/jshA7weztas;tcp
    From-Path: msrp://recipient.example.com:12763/kjhd37s2s20w2a;tcp
       ------fghy678j
```

Again, while the second message may have a new transaction ID (fghy678j), it again contains the message ID (MSG 1) from the first message. In this example, the second INVITE/message also includes the X-EDIT-MessageID command. The X-EDIT-MessageID command can indicate to the recipient UE 104 that this message is intended to edit a previous message, as opposed to being a (new), incoming message. The X-EDIT-MessageID command may seem duplicative when including the message ID from the first message, but this may preclude the need for the recipient UE 104 to maintain a message ID history of the previous message IDs. In other words, the fact that the second message is used to edit the first message is already indicated by the X-EDIT-MessageID command. Thus, rather than performing a comparison of the message ID to a message ID history to determine whether the message is intended to edit a previous message, for example, the recipient UE 104 can simply find the appropriate message in the history of the messaging application.

Regardless of the mechanism used, at 134, the RCS server 106 can send the second message to the recipient UE 104. In the first example, rather than simply displaying the message, the recipient UE 104 can first determine if the message includes a second (or, "new") message ID or a stored (or, "old") message ID for a previously received message (e.g., the message ID for the first message). In this case, the message ID is MSG 1, so the recipient UE 104 can determine that the second message has been sent to modify the first message. As discussed below, the recipient UE 104 can maintain a message ID history of message IDs for previous messages for comparison to the second message.

In the second example, the X-EDIT-MessageID command automatically tells the UE that the second message is sent to modify a previous message. Although the second message is identified with a second transaction ID (because it is a separate message), the message ID (MSG 1) is nonetheless included to indicate that the second message is intended to modify the first message. This may free up memory, processor, and other resources on the recipient UE 104 because the UE 104 is not required to maintain a separate message ID history, for example, or compare the second message to the message ID history to determine if the second message is intended to modify the first message or is an incoming, or new, message.

At 136, as before, the recipient UE 104 can send a MESSAGE RECEIVED acknowledgement to the RCS server 106. In other examples, specific acknowledgement messages can be used for each of the new functions—i.e., edit, recall, delete, etc. In the example above, the message may specifically indicate that the message has been edited—e.g., EDIT OK, or similar. Depending on the messaging application and the network, additional messaging may also follow, such as, for example, MESSAGE READ, USER TYPING, etc.

In some examples, not all UE 102, 104 will have the ability to edit, recall, or delete messages. In some situations, the sender UE 102 may include a messaging application that includes these features, but the recipient UE 104 does not. This may be because the recipient UE 104 does not have the updated application, or because the network associated with the recipient UE 104 does not provide these features, or because the recipient UE 104 is an older model that cannot perform these operations or cannot be updated, among other things.

Regardless of the reason, if the recipient UE 104 does not have the ability to update the stored message with the incoming message, then the recipient UE 104 can return an error message. The recipient UE 104 can return a 603 DECLINE indicating it is unable to complete the request. The sender UE 102 can then display an error message to the user, for example, to enable the user to send another message with the corrections, decline to act further, etc. Of course, for a RECALL or DELETE, these features may simply not be available in this case.

Figure 2:
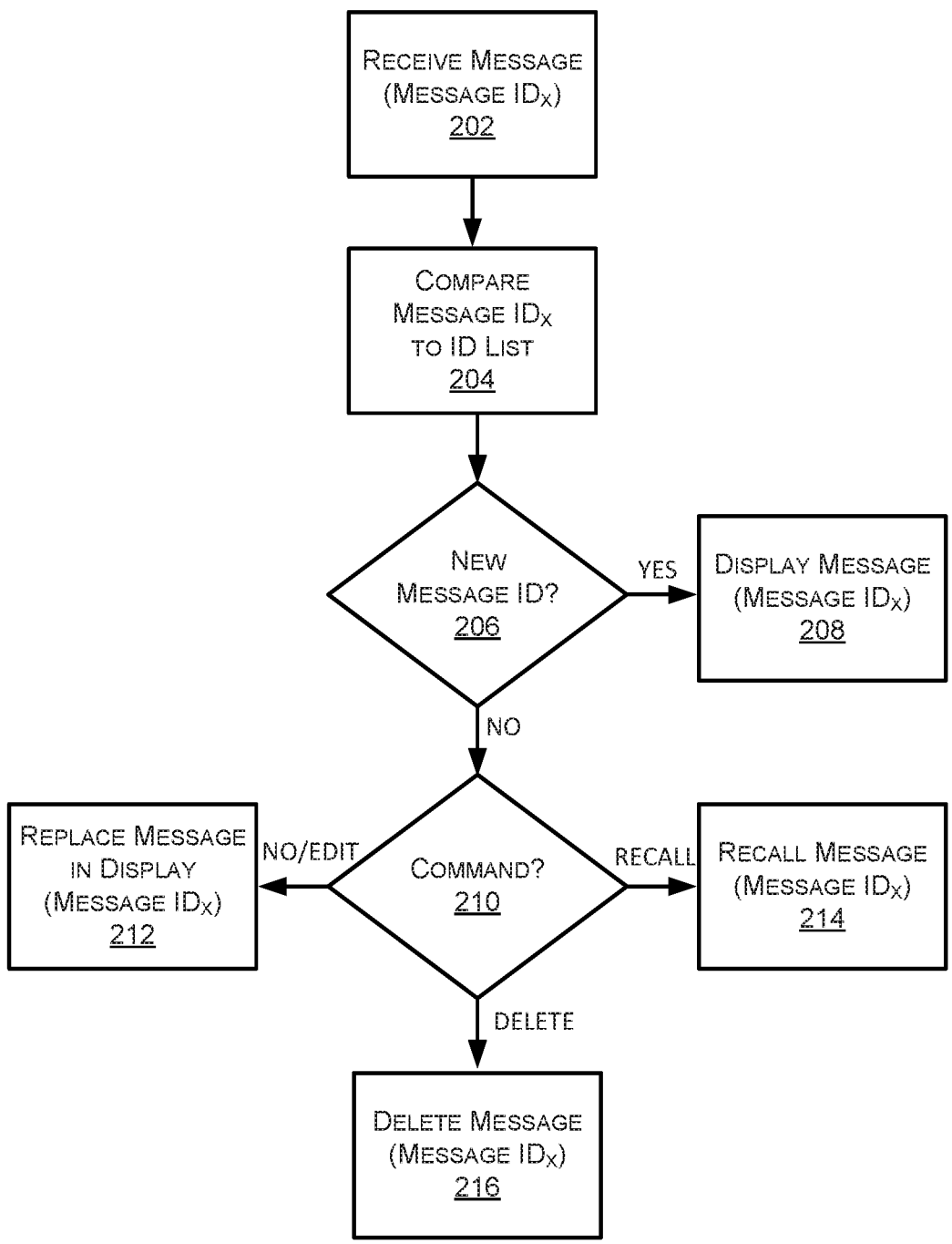
FIG. 2 is a flowchart that depicts an example of a method for receiving a message, determining if the message is a new incoming message or a stored message, and then handling the message accordingly, in accordance with some examples of the present disclosure.

As mentioned above, conventionally, the message ID was not used for anything subsequent to the message being delivered to the recipient (other than the aforementioned deduplication process). To the contrary, as shown in FIG. 2, examples of the present disclosure can comprise a method 200 for using message IDs and/or commands to modify previously sent messages. The method 200 can edit/replace messages by default, but may also include other functions such as recall and delete.

At 202, the UE can receive an incoming message from another UE via the RCS server 106. As mentioned above, the incoming message can include a number of items including the message itself (e.g., text, video, images, etc.) and the message ID, among other things. Rather than automatically displaying the incoming message as in conventional systems, however, the UE can first determine if the message ID for the incoming message, message $ID_X$ in this example, is associated with a stored message (i.e., a message ID that has been seen and needs to be modified), or not.

To this end, the UE can maintain a message ID history of message IDs for some, or all, of the messages received by the UE. The message ID history can be maintained for all messages stored in the history of the messaging application on the UE or for a predetermined period of time (e.g., one month, one week, one day, for each session, etc.), or in any manner chosen by the user or provided by the messaging application. In some examples, message IDs can be removed from the message ID history when a user deletes messages (e.g., to free up memory), for example, or when the messaging application is set to delete messages after a predetermined amount of time and/or received content, etc. The message ID history can be a simple list and can take up relatively little memory, however, because all that is used at this stage is the message ID. At 204, therefore, the UE can compare message $ID_X$ (the message ID of the incoming message) to the message ID history to determine if there is a match.

At 206, based on this comparison, the UE can determine if the incoming message is associated with an incoming message or a stored message. If there is a match for message $ID_X$ in the message ID history, then the message has been sent to modify a stored message, presumably in the history of the messaging application—i.e., if it had been deleted, the message ID would have been deleted from the message ID history. If there is no match for message $ID_X$ in the message ID history, then, in some examples, the message can be treated as an incoming message.

If message $ID_X$ is not included in the message ID history, then at 208, the UE can simply display the incoming message in the conventional manner. In some examples, the message or media associated with message $ID_X$ can be included in the appropriate location (e.g., the bottom) of a dialog box on a graphical user interface (GUI) of the messaging application. In other examples, such as when sequential message IDs are used, the message can be displayed in the order it would have appeared in the dialog box had the message not been deleted (i.e., it can be placed in the "original" location in the dialog box). In this case, the dialog box may automatically scroll to this location when the user opens the messaging application to alert the user that a change has been made to the dialog box.

The dialog box can display the "conversation" between the sender (e.g., sender UE 102) and recipient (e.g., recipient UE 104) of the message. In some examples, such as when the UE is locked, the UE can play a tone to alert the user to an incoming message and/or display a notification on the locked screen of the UE. The messaging application can then display the message when the user opens the messaging application, for example, or unlocks the phone.

If message $ID_X$ is included in the message ID history, on the other hand, then at 210, the UE can determine if a command is included with the incoming message. As mentioned above, in some examples, the method 200 can default to the X-EDIT-MessageID function. In other words, if the message is a standard MSRP message and includes the SEND command, but message $ID_X$ is in the message ID history, then the UE knows that the contents of the incoming message are meant to edit or replace the contents previously found in the stored message associated with message $ID_X$.

In some examples, the UE can simply replace the contents of the stored message with the contents of the incoming message in its entirety. In other examples, the UE can parse the differences between the stored message and the incoming message and merely replace those portions of the message that are different. In still other examples, the incoming message may include code or shorthand that indicates what action is to be taken. In the example above, this may reduce the size of the contents of the incoming message from, "I am stopping at the grocery store for milk, do you need anything?", for example, to "RC37 with 'o'"—replace character 37 of the stored message associated with message $ID_X$ with "o".

Regardless of the actual mechanism of editing the message (replace or edit), the default action—the command assumed when there is no other command other than the standard SEND—can be to replace or edit the message as described in the contents of the incoming message. Of course, the method could also use a specific X-EDIT-MessageID header to remove any ambiguity. In sum, an incoming message with a message ID associated with a stored message and a standard SEND, or an incoming message with the X-EDIT-MessageID header, can both be treated as an EDIT. An EDIT, in turn, can be an actual edit of the stored message or simply a replacement of the stored message with the incoming message.

In some examples, the incoming message can be displayed in the original location in the dialog box (i.e., the location where the stored message would be displayed). The messaging application may automatically scroll to this location, however, or provide another indication that a stored message has been modified. In other examples, the messaging application may place the incoming message at the bottom of the dialog box as if the updated message were an incoming message.

In some examples, in addition to providing the EDIT function, the method 200 can also include a DELETE function and a RECALL function. To this end, if the incoming message includes a RECALL command, then at 214, the UE can recall the message associated with message $ID_X$. Similarly, if the incoming message includes a DELETE command, then at 216, the UE can delete the message associated with message $ID_X$.

A recalled message can be a message that deletes the contents of the stored message, but leaves a notification that the stored message has been recalled. In the place where the contents of the message used to be displayed—e.g., "Did you get my VM?"—the messaging application can simply display, "This message was recalled by John Smith at 9:32 AM." This may be desirable to prevent confusion, for example, as to why a stored message has been changed. Indeed, in some settings (e.g., military or legal settings), this may be standard operating procedure for legal or security reasons—e.g., to maintain chain of custody or leave a "paper trail."

A deleted message, on the other hand, can simply be removed from the GUI altogether, with no notification. Thus, prior to receiving the incoming message, the stored message is displayed in the GUI, and after receiving the incoming message, the stored message simply disappears.

This may be useful in a more casual setting when the sender sent the message to the wrong person, for example, or simply wishes to retract a previous statement.

Figure 3:
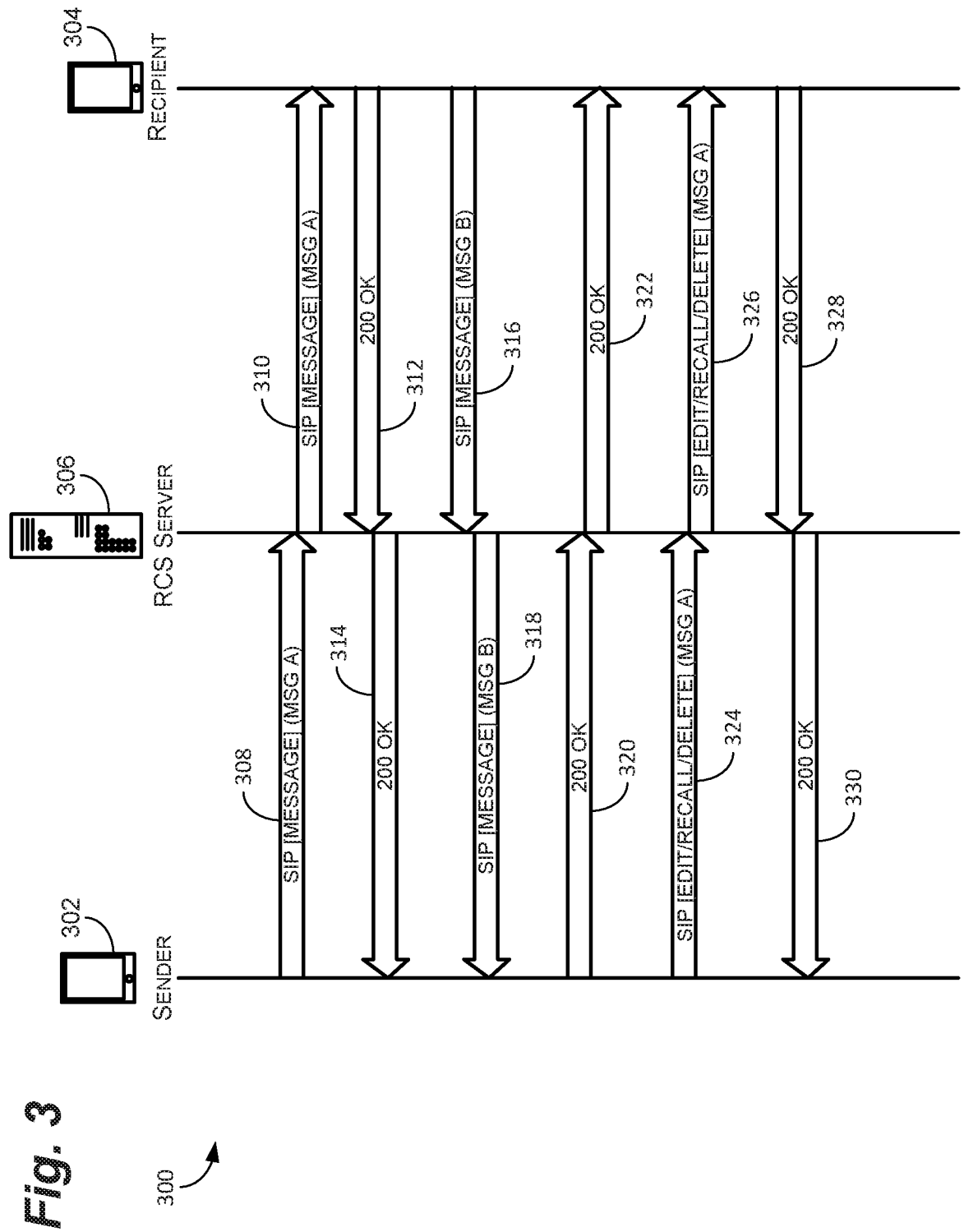
FIG. 3 is a flowchart that depicts an example of a non-session based method for sending, receiving, and modifying messages, in accordance with some examples of the present disclosure.

As shown in FIG. 3, examples of the present disclosure can also include a standalone method 300 for editing, recalling, and deleting messages. In this configuration, it is not necessary to establish a session prior to messaging or editing, recalling, or deleting messages. Each message is sent using the SIP MESSAGE method. As before, however, the method 300 enables the user to edit, recall, or delete previously sent messages. Again, this can be done by reusing the message ID or by instituting new SIP headers—X-EDIT-MessageID, X-RECALL-MessageID, and X-DELETE-MessageID—which can serve the functions discussed above.

The method 300 can again include a sender UE 302, a recipient UE 304, and an RCS server 306. In this case, the RCS server 306 can be a SIP-based server capable of interpreting and routing the SIP messaging discussed below from the sender UE 302 to the recipient UE 304.

At 308, the sender UE can send a SIP MESSAGE, MSG A, to the RCS server 306. As mentioned above, in this example no session is established and the first notification is the message itself. The message can include text, pictures, video, or other media, and also includes a message ID, in this case MSG A. An example SIP MESSAGE is shown below:

```
MESSAGE sip:recipient@domain.com SIP/2.0
    Via: SIP/2.0/TCP
    sender.domain.com;branch=h5uY8jh992srfyyh
    Max-Forwards: 70
    From: sip:sender@domain.com;tag=55821
    To: sip:recipient@domain.com
    Call-ID: MSG A@5.2.4.1
    CSeq: 1 MESSAGE
    Content-Type: text/plain
    Content-Length: 39
    Are you going to the recption tnight?
```

At 310, the RCS server 306 can relay the message to the recipient UE 304. As before, at 312, the recipient UE 304 can return an acknowledgement to the RCS server 306, such as a 200 OK, indicating that the message was properly returned. At 314, the RCS server 306 can relay the 200 OK to the sender UE 302.

In this example, at 316, the recipient UE 304 can then send a message, with message ID MSG B to the sender UE 302. Again, no session is necessary, the SIP message is the message itself and is all the signaling required to initiate communication:

```
MESSAGE sip:sender@domain.com SIP/2.0
    Via: SIP/2.0/TCP
    recipient.domain.com;branch=h5uY8jh992srfyyh
    Max-Forwards: 70
    From: sip:recipient@domain.com;tag=55821
    To: sip:sender@domain.com
    Call-ID: MSG B@5.2.4.1
    CSeq: 1 MESSAGE
    Content-Type: text/plain
    Content-Length: 26
    No, I can't go. Are you?
```

At 318, the RCS server 306 can relay the message to the sender UE 302. At 320, the sender UE 302 can return a 200 OK to indicate that MSG B was successfully received. At 322, the RCS server 306 can relay the 200 OK to the recipient UE 304.

At this point, the user of the sender UE 302 realizes that he or she included several spelling errors in MSG A. And while the user of the recipient UE 304 clearly understood the message despite the misspellings, the user of the sender UE 302 may nonetheless wish to correct the errors. To this end, at 324, the sender UE 302 can send a corrected message to correct the misspellings in MSG A.

As with the session-based method 200, this can be accomplished in at least two ways. The first possibility is to simply resend the message with the same message ID, MSG A, but with the contents of the message corrected:

```
MESSAGE sip:recipient@domain.com SIP/2.0
    Via: SIP/2.0/TCP
    sender.domain.com;branch=h5uY8jh992srfyyh
    Max-Forwards: 70
    From: sip:sender@domain.com;tag=55821
    To: sip:recipient@domain.com
    Call-ID: MSG A@5.2.4.1
    CSeq: 1 MESSAGE
    Content-Type: text/plain
    Content-Length: 41
    Are you going to the reception tonight?
```

The recipient UE 304 can then use a method the same as, or similar to, the method 200 discussed above in FIG. 2. Thus, the recipient UE 304 can compare the message ID (MSG A) of the incoming message to a list of previous messages to determine that the incoming message is intended to replace a stored message. The recipient UE 304 can then replace the contents of the stored message associated with MSG A with the contents of the incoming message (also with the message ID MSG A) with the corrections. Thus, the stored message is simply replaced or corrected in the messaging application on the recipient UE 304 with the two corrections as listed above.

The second possibility is the addition of new SIP headers to provide the EDIT, RECALL, and DELETE functions directly to the message. As before, this may preclude the need to maintain a list of previous message IDs and can also provide the additional RECALL and DELETE functions. In this example, because the user simply wishes to correct a previous message, the EDIT command can be used:

```
sip:recipient@domain.com SIP/2.0
    Via: SIP/2.0/TCP
    sender.domain.com;branch=h5uY8jh992srfyyh
    Max-Forwards: 70
    From: sip:sender@domain.com;tag=55821
    To: sip:recipient@domain.com
    Call-ID: MSG A@5.2.4.1
        X-EDIT-MessageID: MSG A
    CSeq: 1 MESSAGE
    Content-Type: text/plain
    Content-Length: 41
    Are you going to the reception tonight?
```

In this configuration, the recipient UE 304 is notified in the X-EDIT-MessageID header of the message that the incoming message is associated with a stored message. The message ID, MSG A, is still included to indicate the stored message to which the EDIT is directed. As mentioned above, this may obviate the steps of maintaining a list of previous message IDs and comparing the incoming message ID to the list to determine that the incoming message is an EDIT and not an incoming message.

Regardless of the method used, at 326, the RCS server 306 can relay the corrected message to the recipient UE 304.

Upon receipt, the recipient UE 304 can determine the incoming message is intended to edit a stored message (either using the message ID or the EDIT command). The recipient UE 304 can then replace or edit the contents of the stored message with the contents of the incoming message—in this case, correcting the two typographical errors.

At 328, the recipient UE 304 can return a 200 OK indicating the incoming message was received. In some cases, the recipient UE 304 may send the 200 OK in response to merely receiving the message. In other examples, the recipient UE 304 may locate and edit the stored message before sending the 200 OK. In this manner, the 200 OK indicates not only that the recipient UE 304 properly received the message, but that the stored message has been successfully edited. At 330, the RCS server 306 can relay the 200 OK to the sender UE 302, completing the process.

Of course, while described as being performed on the UEs 102, 104, 302, 304 could be partially or completely performed by the RCS servers 106, 306. The RCS servers 106, 306 could maintain the message ID lists, for example, and provide notifications to the UEs 102, 104, 302, 304 about whether the incoming message is associated with an incoming message or a stored message. In some examples, the UEs 102, 104, 302, 304 could send a standard message command—e.g., SEND for MSRP or MESSAGE for SIP—but the RCS servers 106, 306 can determine that the message ID for the incoming message is associated with a stored message using a list of previous message IDs. The RCS servers 106, 306 can then translate the message to an EDIT command and relay the message to the appropriate UE 102, 104, 302, 304. Some of these configurations are discussed below in FIG. 7.

Figure 4:
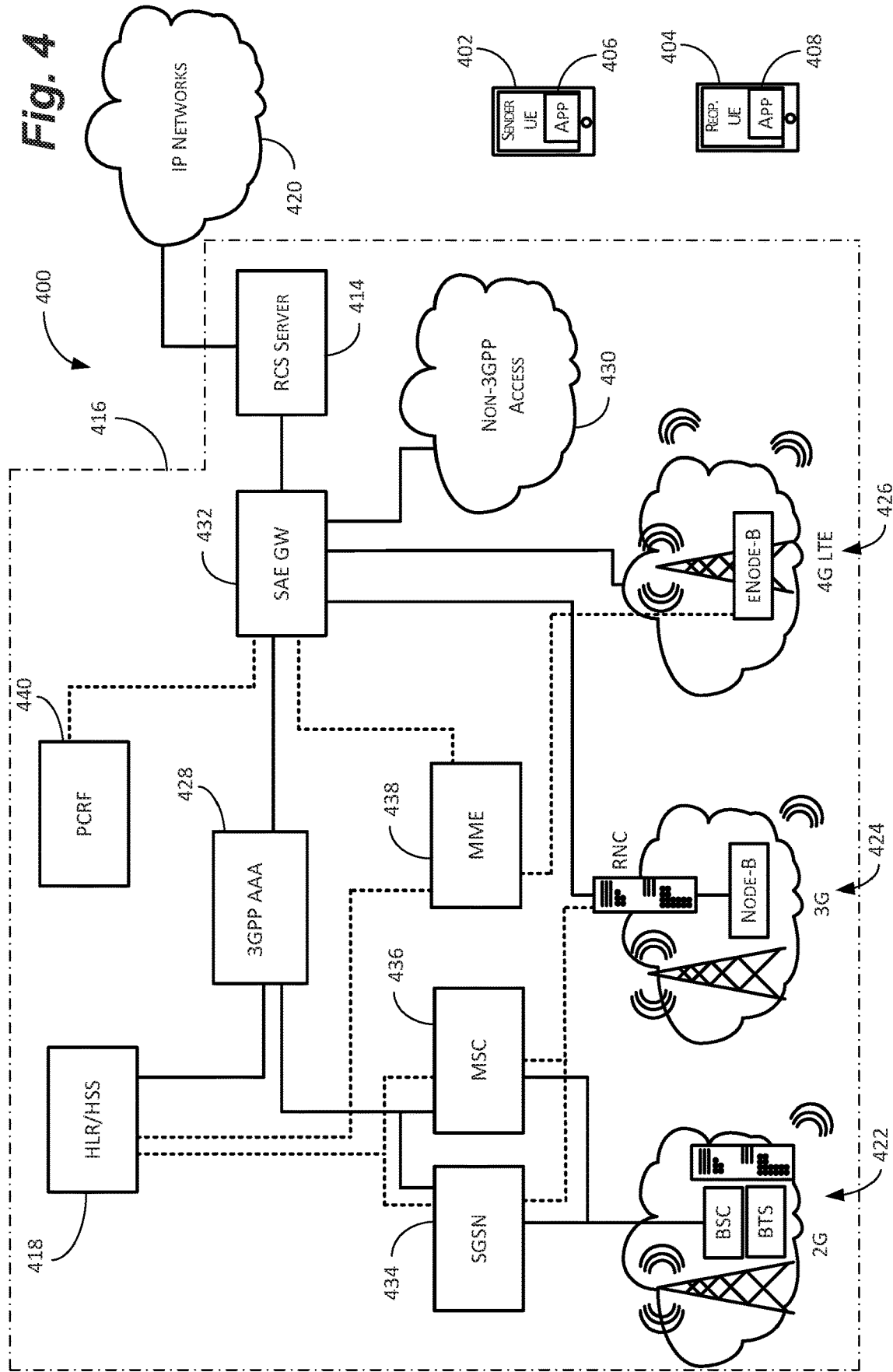
FIG. 4 depicts a network including a plurality of user equipment (UE) running applications that can be used to send, receive, and modify messages, in accordance with some examples of the present disclosure.

FIG. 4 is an example of such a system 400 for editing, recalling, or deleting messages in a communications network. The system 400 can include a plurality of UEs 402, 404 (e.g., UEs 102, 104, 302, 304), each including at least one messaging application 406, 408. The messaging applications 406, 408 need not be the same, but can have the additional features discussed above with reference to the respective methods 100, 200, 300. The UEs 402, 404 can comprise, for example, cell phones, smart phones, tablet computers, laptop computers, or any other network-connected device capable of sending the messages discussed herein (e.g., messages including text, photos, video, sounds, emoji, and other content). Indeed, the system 400 can be used in conjunction with any type of transmitted data network; and thus, the UEs 402, 404 could be associated with 2G, 3G, 4G LTE, 5G, Wi-Fi, Bluetooth®, wired, Internet of Things (IoT), or virtually any other kind of network. The system 400 is described herein as being associated with a cellular network 416, but could be used with other types of data and/or voice networks without departing from the spirit of the disclosure. Of course, while two UEs 402, 404 are depicted for clarity, in practice, a multitude of UEs can be in communication on multiple interconnected networks 416.

The UEs 402, 404 can include one or more messaging applications 406, 408 to provide messaging and at least one if the methods 100, 200, 300 discussed above. As the name implies, the messaging applications 406, 408 can enable users to send and receive messages. In this case, however, the messaging applications 406, 408 can also enable old messages to be edited, recalled, and/or deleted. As discussed above, this can be done by comparing the message ID of an incoming message to previous message IDs or by using one or more new MSRP or SIP commands (e.g., EDIT, RECALL, and/or DELETE).

The messaging application(s) 406, 408 can work in conjunction with an RCS server 414 (e.g., RCS servers 106, 306). The RCS server 414 can receive messages and relay them to the addressee (e.g., the UEs 402, 404). In some examples, as mentioned above, the RCS server 414 can also perform some, or all, of the steps associated with the methods 100, 200, 300. The RCS server 414 can store a list of previous message IDs, for example, to differentiate between incoming messages and stored messages, among other things. The RCS server 414 can be a standalone server or can be executed by an existing network device such as, for example, an HLR/HSS 418 or a 3GPP AAA server 428, discussed below.

For ease of explanation, the system 400 is described herein for use with a cellular network 416. As mentioned above, however, the system 400 could also be used with other types of wired and wireless networks capable of providing messaging. The cellular network 416 can include, for example, 2G 422, 3G 424, and 4G long-term evolution (LTE) 426 components. Of course, future technologies, such as, for example, 5G, Internet of Things (IoT), and device-to-device (D2D) components could also be included and are contemplated herein. Many of the "back-end" components of the cellular network 416 are currently involved in various portions of voice and data transmissions, including text, video, and other messaging, from the cellular network 416 to the UEs 402, 404. Thus, a portion of the messaging application 406, 408 and some, or all, of the RCS server 414 could be located on one or more of, for example, the HLR/HSS 418, a 3GPP AAA server 428, or other components. In other words, the messaging applications 406, 408 and RCS server 414 can be standalone or can be at least partially integrated into one of the existing network components.

As is known in the art, data can be routed from the Internet or from other sources using a circuit switched modem connection (or non-3GPP connection) 430, which provides relatively low data rates, or via IP based packet switched connections, which results in higher bandwidth. In the LTE network 426, which is purely IP based, data is routed straight from the Internet to the service architecture evolution gateway (SAE GW) 432 to evolved Node B transceivers, enabling higher throughput.

The serving GPRS support node (SGSN) 434 is a main component of the general packet radio service (GPRS) network, which handles all packet switched data within the cellular network 416—e.g. the mobility management and authentication of the users. The MSC 436 is the primary service delivery node for global system for mobile communication (GSM) and code division multiple access (CDMA), responsible for routing voice calls and short messaging service (SMS) messages, as well as other services (such as conference calls, fax, and circuit switched data). The MSC 436 sets up and releases the end-to-end connection, handles mobility and hand-over requirements during the call, and takes care of billing and real time pre-paid account monitoring.

Similarly, the mobility management entity (MME) 438 is the key control-node for the 4G LTE network 426. It is responsible for idle mode UEs 402, 404 paging and tagging procedures including retransmissions. The MME 438 is involved in the bearer activation/deactivation process and is also responsible for choosing the SAE GW 432 for the UEs 402, 404 at the initial attach and at the time of intra-LTE handover involving core network (CN) node relocation (i.e., switching from one cell site to the next when traveling). The MME 438 is responsible for authenticating the user (by interacting with the HLR/HSS 418 discussed below). The non-access stratum (NAS) signaling terminates at the MME 438 and it is also responsible for generation and allocation of temporary identities to UEs 402, 404. The MME 438 also checks the authorization of the UEs 402, 404 to camp on the service provider's home public land mobile network (HPLMN—for non-roaming users) or visiting public land mobile network (VPLMN—for roaming users) and enforces UEs 402, 404 roaming restrictions on the VPLMN. The MME 438 is the termination point in the network for ciphering/integrity protection for NAS signaling and handles the security key management. The MME 438 also provides the control plane function for mobility between LTE 426 and 2G 422 and 3G 424 access networks with the S3 interface terminating at the MME 438 from the SGSN 434. The MME 438 also terminates the S1a interface towards the home HLR/HSS 418 for roaming UEs 402, 404.

The HLR/HSS 418 is a central database that contains user-related and subscription-related information. The functions of the HLR/HSS 418 include functionalities such as mobility management, call and session establishment support, user authentication and access authorization. The HSS, which is used for LTE connections, is based on the previous HLR and authentication center (AuC) from CGMA and GSM technologies, with each serving substantially the same functions for their respective networks.

To this end, the HLR/HSS 418 can also serve to authenticate the messaging application 406, 408, provide routing instructions (e.g., IP addresses or phone numbers), and provide any billing associated with messages. So, for example, the messaging application 406, 408 can send the messages to the RCS server 414, which can then provide information to the HLR/HSS 418 with the necessary credentials to enable the messaging application 406, 408 to access the cellular network 416. Once authenticated, the HLR/HSS 418 can then ensure the user is authorized to send messages, for example, or send an authorization request to the 3GPP AAA server 428, discussed below.

The policy and charging rules function (PCRF) 440 is a software node that determines policy rules in the cellular network 416. The PCRF 440 generally operates at the network core and accesses subscriber databases (e.g., the HLR/HSS 418) and other specialized functions, such as content handling (e.g., whether the user has sufficient data left in their plan to receive a multimedia message), in a centralized manner. The PCRF 440 is the main part of the cellular network 416 that aggregates information to and from the cellular network 416 and other sources. The PCRF 440 can support the creation of rules and then can automatically make policy decisions for each subscriber active on the cellular network 416. The PCRF 440 can also be integrated with different platforms like rating, charging, and subscriber databases or can also be deployed as a standalone entity.

Finally, the 3GPP AAA server 428 performs authentication, authorization, and accounting (AAA) functions and may also act as an AAA proxy server. For wireless local area network (WLAN) access to (3GPP) IP networks 420, the 3GPP AAA server 428 provides authorization, policy enforcement, and routing information to various WLAN components. The 3GPP AAA server 428 can generate and report billing/accounting information, perform offline billing control for the WLAN, and perform various protocol conversions when necessary. The 3GPP AAA server 428 can also facilitate messaging from the IP networks 420 to the cellular network 416. Thus, the 3GPP AAA server 428 can determine if the user is authorized to access content and handle some or all of the routing from the HLR/HSS 418 to the messaging application 406, 408, among other things.

In some examples, the HLR/HSS 418 and/or 3GPP AAA server 428 can contain some, or all, of the components of the system 400. The HLR/HSS 418 and/or 3GPP AAA server 428 can include, for example, the RCS server 414, and other functions. Of course, as mentioned above, other components (e.g., the PCRF 440 or MME 438) could also include some, or all, of the system 400.

Figure 5:
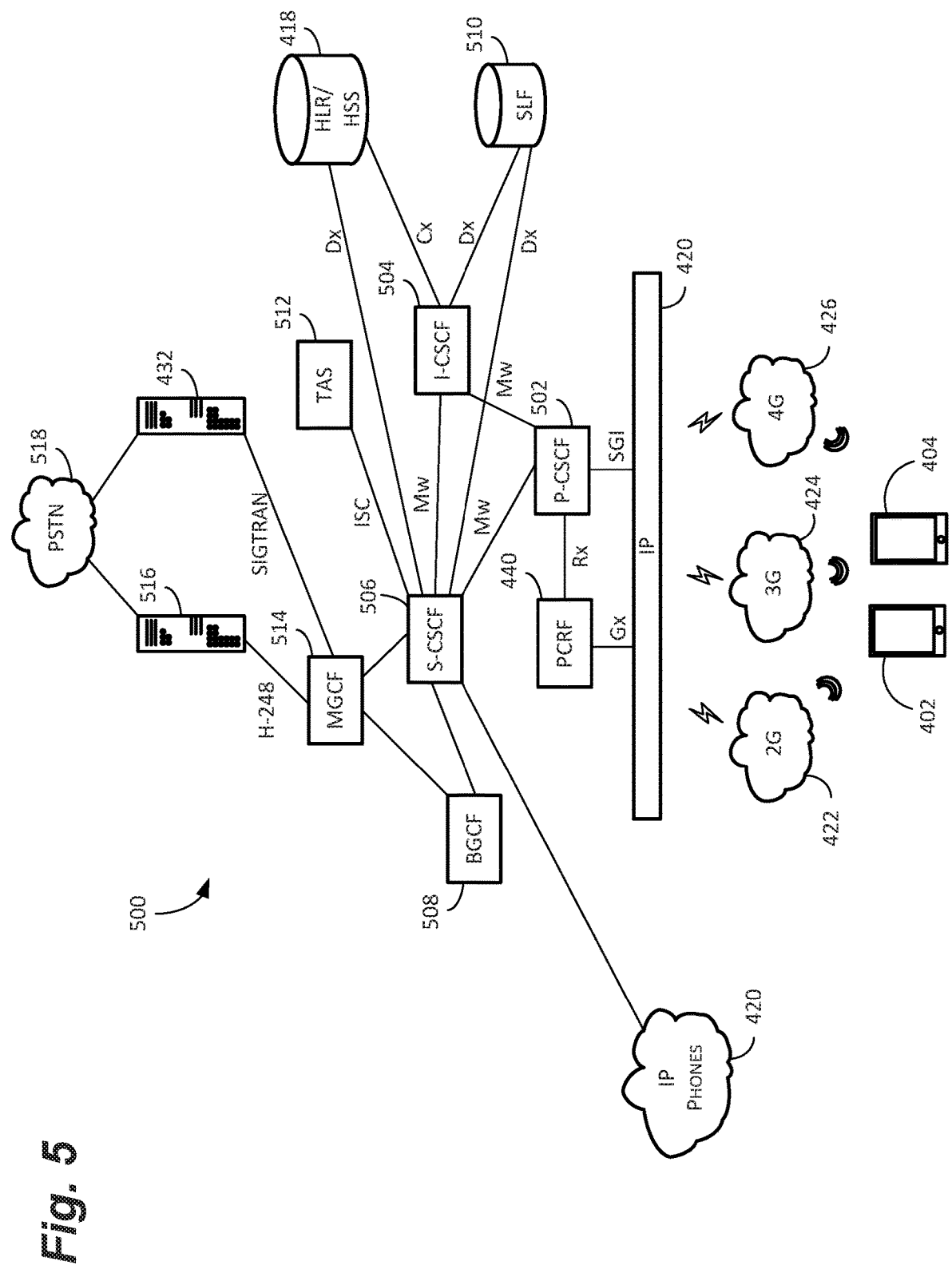
FIG. 5 depicts an internet protocol multimedia subsystem (IMS) portion of the network shown in FIG. 4, in accordance with some examples of the present disclosure.

FIG. 5 includes a more detailed view of the components of the internet protocol multimedia subsystem (IMS) 500 for the 4G LTE network 426. As shown, the IMS 500 includes several network components for routing signals, storing subscriber information, and connecting across various subsystems and network types. The IMS 500 is built on SIP as is the base to further support packaging of voice, video, data, fixed, and mobile services on a single platform to end users. It enables communications across multiple types of networks, including cellular, satellite, broadband, cable, and fixed networks, and enables the creation of efficient interoperating networks. The IMS 500 can also enable the new SIP commands and "session-less" messaging discussed above with respect to FIG. 3.

The IMS 500 also provides interoperability for the UEs 402, 404 and other devices across multiple platforms including, for example, 2G 422, 3G 424, 4G 426, and IP 420 networks. The IMS 500 also includes some components already discussed more generally in FIG. 4. These include, for example, the PCRF 440, HLR/HSS 418, and SAE GW 432.

The IMS 500 also includes a proxy-call session control function (P-CSCF) 502. The P-CSCF 502 is the entry point to the IMS 500 and serves as the outbound proxy server for the UEs 402, 404. The UEs 402, 404 attach to the P-CSCF 502 prior to performing IMS registrations and initiating SIP sessions. The P-CSCF 502 may be in the home domain of the IMS operator, or it may be in the visiting domain, where one or more of the UEs 402, 404 are currently roaming. For attachment to a given P-CSCF 502, the UEs 402, 404 perform P-CSCF 502 discovery procedures. Attachment to the P-CSCF 502 enables the UEs 402, 404 to initiate registrations and sessions with the IMS 500.

The IMS 500 also includes an interrogating-call session control function (I-CSCF) 504. The I-CSCF 504 acts as an inbound SIP proxy server in the IMS 500. During IMS registrations, the I-CSCF 504 queries the HLR/HSS 418 to select the appropriate S-CSCF 506 (discussed below) which can serve the UEs 402, 404. During IMS sessions, the I-CSCF 504 acts as the entry point to terminating session requests. The I-CSCF 504 routes the incoming session requests to the S-CSCF 506 of the called party.

The IMS 500 also includes a serving-call session control function (S-CSCF) 506. The S-CSCF 506 acts as a registrar server, and in some cases, as a redirect server. The S-CSCF 506 facilitates the routing path for mobile-originated or mobile-terminated session requests. The S-CSCF 506 also interacts with various components for playing tones and announcements, among other things. For the session-based method 100, discussed above, the S-CSCF 506 can receive messages from the UEs 402, 404 or the HLR/HSS 418, for example, and establish the appropriate sessions with the RCS server 414 or other telephony applications servers (TASs) 512 according to the services requested by the UEs 402, 404.

The IMS 500 also includes a breakout gateway control function (BGCF) 508. The BGCF 508 is the IMS 500 element that selects the network in which PSTN 518 (discussed below) breakout is to occur. If the breakout is to occur in the same network as the BGCF 508, for example, then the BGCF 508 selects a media gateway control function (MGCF) 514 (also discussed below) that will be responsible for interworking with the PSTN 518. The MGCF 514 then receives the SIP signaling from the BGCF 508.

The IMS 500 also includes a subscriber location function (SLF) 510. The SLF 510 provides information about the HLR/HSS 418 that is associated with a particular user profile. It is generally implemented using a database. If the IMS 500 contains more than one HLR/HSS 418, then the I-CSCF 504 and S-CSCF 506 will communicate with SLF 510 to locate the appropriate HLR/HSS 418 based on the user profile.

The IMS 500 also includes the aforementioned TAS(s) 512. As the name implies, the TAS 512, sometimes known in a telephony context only as an application server (AS), is a component used to provide telephony applications and additional multimedia functions. The TAS 512 can include any entity in a telephone network that carries out functions that are not directly related to the routing of messages through the network. Such functions can include, for example, in-network answering machines, automatic call forwarding, conference bridges and other types of applications. And, while shown as a single entity in FIG. 5, multiple TASs 512 are generally used to provide multiple services. Based on the services requested by the UE 402, 404 to the S-CSCF 506, for example, the S-CSCF 506 can establish sessions with one or more TASs 512, one TAS 512 for each service.

The IMS 500 also includes the MGCF 514. The MGCF 514 is a SIP endpoint that handles call control protocol conversion between SIP and ISDN user part (ISUP)/bearer-independent call control (BICC) and interfaces with the SAE GW 432 over stream control transmission protocol (SCTP). The MGCF 514 also controls the resources in a media gateway (MGW) 516 across an H.248 interface. The MGW 516 is a translation device or service that converts media streams between disparate telecommunications technologies such as POTS, SS7, next generation networks (2G 422, 3G 424, and 4G LTE 426) or private branch exchange (PBX) systems.

Finally, the IMS 500 also includes a public switched telephone network (PSTN) 518. The PSTN 518 is the world's collection of interconnected voice-oriented public telephone networks, both commercial and government-owned. It's also referred to as the plain old telephone service (POTS). With respect to IP phones 420, for example, the PSTN 518 furnishes much of the Internet's long-distance infrastructure. Because internet service providers (ISPs) pay long-distance providers for access to their infrastructure and share the circuits among many users through packet-switching (discussed above), internet users avoid having to pay usage tolls to anyone other than their ISPs.

Figure 6:
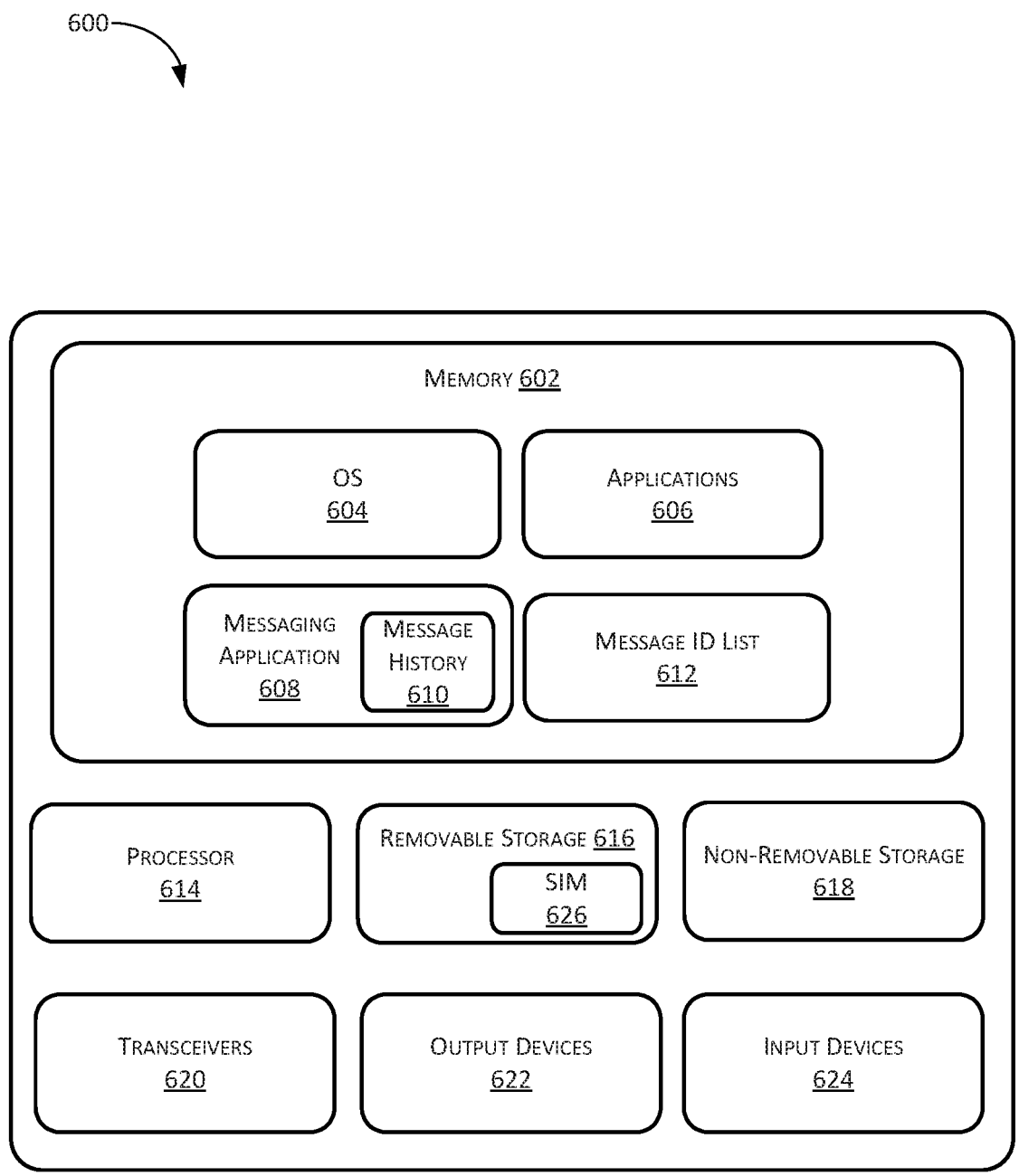
FIG. 6 is an example of a UE for use with the systems and methods disclosed herein, in accordance with some examples of the present disclosure.

FIG. 6 depicts a component level view of a UE 600 (e.g., any of the UEs 102, 104, 302, 304, 402, 404) for use with the systems 400, 500 and methods 100, 200, 300 described herein. The UE 600 could be any UE able to send and receive messages in the cellular network 416 or to the cellular network 416. For clarity, the UE 600 is described herein generally as a cell phone or smart phone. One of skill in the art will recognize, however, that the systems 400, 500 and methods 100, 200, 300 described herein can also be used with a variety of other electronic devices, such as, for example, tablet computers, laptops, desktops, and other network (e.g., cellular or IP network) connected devices.

The UE 600 can comprise several components to execute the above-mentioned functions. As discussed below, the UE 600 can each comprise memory 602 including one or more standard applications 606 including many common features such as, for example, contacts, calendars, call logs, voice-mail, etc. In some examples, the memory 602 can also include the operating system (OS) 604. In this case, the UE 600 can also comprise a messaging application 608 (e.g., messaging applications 406, 408), message history 610, and/or message ID list 612.

The UE 600 can also comprise one or more processors 614 and one or more of removable storage 616, non-removable storage 618, transceiver(s) 620, output device(s) 622, and input device(s) 624. In some examples, such as for cellular communication devices, the UE 600 can also include a SIM 626 including an international mobile subscriber identity (IMSI), and other relevant information. In some examples, one or more of the functions (e.g., the message history 610 and/or the message ID list 612) can be stored on the SIM 626 in addition to (as a backup), or instead of, being stored in the memory 602.

In various implementations, the memory 602 can be volatile (such as random access memory (RAM)), non-volatile (such as read only memory (ROM), flash memory, etc.), or some combination of the two. The memory 602 can include all, or part, of the functions 606, 608, 610, 612 and the OS 604 for the UE 600, among other things. In some examples, rather than being stored in the memory 602, some, or all, of the functions and messages can be stored on a remote server or cloud of servers accessible by the UE 600 such as the RCS server 106, 306, 414.

The memory 602 can also include the OS 604. Of course, the OS 604 varies depending on the manufacturer of the UE 600 and currently comprises, for example, iOS 11.2.6 for Apple products and Oreo for Android products. The OS 604 contains the modules and software that support a computer's basic functions, such as scheduling tasks, executing applications, and controlling peripherals. In some examples, the OS 604 can receive signals from the messaging application 608, for example, to cause the UE 600 to send messages, compare message IDs to the message ID list 612, and edit, recall, or delete messages, etc. The OS 604 can also enable the UE 600 to send and retrieve data via a cellular data connection or internet connection and perform other functions.

The UE 600 can also include at least one messaging application 608 capable of performing some, or all, of one or more of the methods 100, 200, 300 discussed above. So, for example, the messaging application 608 can receive incoming messages, determine if the message ID on the incoming message matches one in the message ID list 612, and then handle the incoming message as either an incoming message or a modification of a stored message. If the incoming message is a stored message, the messaging application 608 can modify the stored message associated with the message ID indicated in the incoming message. The messaging application 608 can provide the EDIT, RECALL, and DELETE functions discussed above, and can interpret the new MSRP or SIP messages associated with these functions.

As the name implies, the message history 610 can include all of the messages received and sent by the UE 600 for some period of time. In some examples, the message history 610 can include all messages sent and received that have not been deleted by the user (as opposed to being time delineated). In other examples, the message history 610 can include only those messages sent and received over some previous period of time (e.g., one day, one week, one month, etc.) The message history 610 can enable the messaging application 608 to modify stored messages based on incoming messages with the same message ID or based on a command in the incoming message, among other things.

In some examples, the UE 600 can also include message ID list 612. In contrast to the messaging application 608—which may include the message ID, the content of the message, and other information—the message ID list 612 can be a simple list of message IDs for the messages in the message history 610. This can enable the messaging application 608 to quickly determine if an incoming message is associated with an incoming message or a stored message. As mentioned above, this feature may be somewhat obviated when using new messaging commands such as X-EDIT-MessageID, X-RECALL-MessageID, and X-DELETE-MessageID, which already indicate that the incoming message is intended to modify a stored message.

The UE 600 can also comprise one or more processors 614. In some implementations, the processor(s) 614 can be a central processing unit (CPU), a graphics processing unit (GPU), both CPU and GPU, or any other processing unit. The UE 600 may also include additional data storage devices (removable and/or non-removable) such as, for example, magnetic disks, optical disks, or tape. Such additional storage is illustrated in FIG. 6 by removable storage 616 and non-removable storage 618. The removable storage 616 and non-removable storage 618 can store some, or all, of the functions 606, 608, 610, 612 and/or the OS 604.

Non-transitory computer-readable media may include volatile and nonvolatile, removable and non-removable tangible, physical media implemented in technology for storage of information, such as computer readable instructions, data structures, program modules, or other data. The memory 602, removable storage 616, and non-removable storage 618 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the UE 600. Any such non-transitory computer-readable media may be part of the UE 600 or may be a separate database, databank, remote server, or cloud-based server.

In some implementations, the transceiver(s) 620 include any transceivers known in the art. In some examples, the transceiver(s) 620 can include wireless modem(s) to facilitate wireless connectivity with the other UE, the Internet, and/or an intranet via the cellular network 416. Further, the transceiver(s) 620 may include a radio transceiver that performs the function of transmitting and receiving radio frequency communications via an antenna (e.g., Wi-Fi or Bluetooth®). In other examples, the transceiver(s) 620 may include wired communication components, such as a wired modem or Ethernet port, for communicating with the other UE or the provider's internet-based network. The transceiver(s) 620 can enable the UE 600 to send and receive messages and commands associated with the systems 400, 500 and methods 100, 200, 300 described above.

In some implementations, the output device(s) 622 include any output devices known in the art, such as a display (e.g., a liquid crystal or thin-film transistor (TFT) display), a touchscreen display, speakers, a vibrating mechanism, or a tactile feedback mechanism. In some examples, the output devices can play various sounds when sending or receiving a message. In some examples, the output device(s) 622 may play a different sound or display a different graphic depending on whether the user is sending an incoming message or modifying a stored message. The output device(s) 622 may also play an error tone or display an error message when a recipient UE 104, 304 is unable to modify a message, for example, as requested by the sender UE 102, 302. Output device(s) 622 can also include ports for one or more peripheral devices, such as headphones, peripheral speakers, or a peripheral display.

In various implementations, input device(s) 624 include any input devices known in the art. For example, the input device(s) 624 may include a camera, a microphone, or a keyboard/keypad. The input device(s) 624 can include a touch-sensitive display or a keyboard to enable users to enter data and send messages via the messaging application 608. The touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like.

Figure 7:
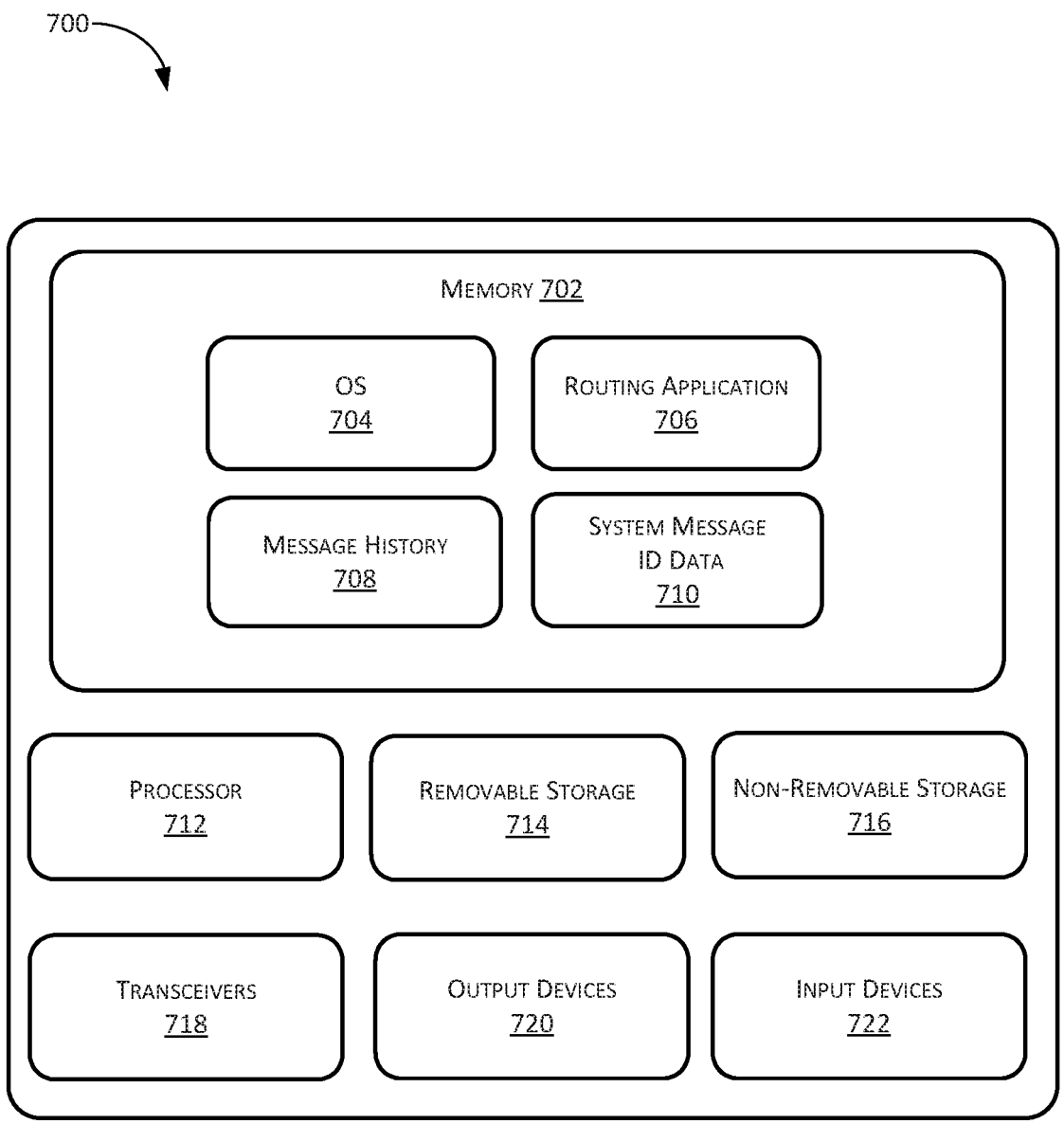
FIG. 7 is an example of an RCS server for use with the systems and methods disclosed herein, in accordance with some examples of the present disclosure.

As shown in FIG. 7, the systems 400, 500 and methods 100, 200, 300 can also be used in conjunction with an RCS server 700 (e.g., RCS servers 106, 306, 414). To simplify the discussion, the RCS server 700 is discussed below as a standalone server. One of skill in the art will recognize, however, that the systems 400, 500 and methods 100, 200, 300 disclosed herein can also be implemented partially, or fully, on a network entity such as, for example, the PCRF 440 or 3GPP AAA server 428. Thus, the discussion below in terms of the RCS server 700 is not intended to limit the disclosure to the use of a standalone server.

The RCS server 700 can be a TAS server capable of providing messaging services, including modifying stored messages, as discussed above. The RCS server 700 can comprise a number of components to execute part, or all, of the above-mentioned methods 100, 200, 300 and can be used as part of the systems 400, 500 discussed above. The RCS server 700 can comprise memory 702 including, for example, an OS 704, a routing application 706, a message history 708, and system message ID data 710. In various implementations, the memory 702 can be volatile (such as RAM), non-volatile (such as ROM, flash memory, etc.), or some combination of the two. The memory 702 can include all, or part, of the functions 706, 708, 710 and the OS 704 for the RCS server 700, among other things.

The OS 704 can vary depending on the manufacturer of the RCS server 700 and the type of component. Many servers, for example, run Linux or Windows Server. Dedicated cellular routing servers may run specific telecommunications OSs 704. The OS 704 contains the modules and software that supports a computer's basic functions, such as scheduling tasks, executing applications, and controlling peripherals. The OS 704 can enable the RCS server 700 to receive messages and relay the messages to the addressee (e.g., the recipient UE 104, 304. 404). In some examples, as discussed below, the OS 704 can also enable the RCS server 700 to perform some, or all, of the methods 100, 200, 300 discussed herein.

In this case, the RCS server 700 can also include the routing application 706. The routing application 706 can enable the RCS server 700 to route messages from the sender UE 102, 302, 402 to the recipient UE 104, 304, 404 through the cellular network 416 and/or the IP networks 420. In some examples, the routing application 706 can work in concert with other network entities, such as the HLR/HSS 418, to perform this function 706.

In some examples, the RCS server 700 can also include the message history 708 for a plurality of UE (e.g., UEs 102, 104, 302, 304, 402, 404, and others on the cellular network 416). Thus, the RCS server 700 can store history for users with certain types of accounts, for a particular network provider, in a particular geographic area, or some other subset of network users. Storing the message history 708 on the RCS server 700 can enable the RCS server 700 to modify messages as detailed in an incoming message, for example, and send the modified message to the UE 600. In this manner, the processing and memory demands on the UE 600 can be reduced, among other things.

Due to potential privacy and/or legal concerns, this configuration may not be a standard configuration. It is nonetheless contemplated herein as a possible configuration where, for example, privacy concerns are not implicated. Thus, for a messaging service in use by a governmental agency, for example, where the messages are deemed to be in the public domain at all times, the RCS server 700 can provide a centralized repository of messages. Similarly, this configuration may be useful where the contents and sender/recipient of the messages can be sufficiently anonymized, encrypted, and/or otherwise protected.

The RCS server 700 can also include system message ID data 710. Like the message ID list 612 discussed above for the UE 600, the system message ID data 710 can comprise a relatively simple list of message IDs. In this case, rather than being specific to a particular UE 600, however, the system message ID data 710 can include message IDs for messages for a larger subset of users. The system message ID data 710 can include all message IDs for a certain area, for a particular network provider, in a particular geographic area, or some other subset of messages. The system message ID data 710 can enable the RCS server 700 to perform the identification portion of the methods 100, 200, 300—i.e., identifying the message as being associated with an incoming message or a stored message. In this configuration, the RCS server 700 may add data to the incoming message to indicate to the UE 600 that the incoming message is associated with either a stored message or an incoming message. Again, this may reduce the processing and memory demands on the UE 600, among other things.

The RCS server 700 can also comprise one or more processors 712. In some implementations, the processor(s) 712 can be a central processing unit (CPU), a graphics processing unit (GPU), both CPU and GPU, or any other processing unit. The RCS server 700 can also include one or more of removable storage 714, non-removable storage 716, transceiver(s) 718, output device(s) 720, and input device(s) 722.

The RCS server 700 may also include additional data storage devices (removable and/or non-removable) such as, for example, magnetic disks, optical disks, or tape. Such additional storage is illustrated in FIG. 7 by removable storage 714 and non-removable storage 716. The removable storage 714 and non-removable storage 716 can store some, or all, of the OS 704 and functions 706, 708, 710.

Non-transitory computer-readable media may include volatile and nonvolatile, removable and non-removable tangible, physical media implemented in technology for storage of information, such as computer-readable instructions, data structures, program modules, or other data. The memory 702, removable storage 714, and non-removable storage 716 are all examples of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information and which can be accessed by the RCS server 700. Any such non-transitory computer-readable media may be part of the RCS server 700 or may be a separate database, databank, remote server, or cloud-based server.

In some implementations, the transceiver(s) 718 include any transceivers known in the art. In some examples, the transceiver(s) 718 can include wireless modem(s) to facilitate wireless connectivity with the UE, the Internet, the cellular network 416, and/or an intranet via a cellular connection. Further, the transceiver(s) 718 may include a radio transceiver that performs the function of transmitting and receiving radio frequency communications via an antenna (e.g., Wi-Fi or Bluetooth®) to connect to the IP network 420. In other examples, the transceiver(s) 718 may include wired communication components, such as a wired modem or Ethernet port. The transceiver(s) 718 can enable the RCS server 700 to communicate with the UEs 102, 104, 302, 304, 402, 404 and to send and receive messages between the UEs 102, 104, 302, 304, 402, 404 and/or other UEs.

In some implementations, the output device(s) 720 include any output devices known in the art, such as a display (e.g., a liquid crystal or thin-film transistor (TFT) display), a touchscreen display, speakers, a vibrating mechanism, or a tactile feedback mechanism. In some examples, the output devices can play various sounds based on, for example, whether the RCS server 700 is connected to a network, when a message is sent or received, when a message is modified, or when a message modification is rejected by an incompatible UE 600, among other things. Output device(s) 720 also include ports for one or more peripheral devices, such as headphones, peripheral speakers, or a peripheral display.

In various implementations, input device(s) 722 include any input devices known in the art. For example, the input device(s) 722 may include a camera, a microphone, a keyboard/keypad, or a touch-sensitive display. A keyboard/keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

While several possible examples are disclosed above, examples of the present disclosure are not so limited. For instance, while the systems and methods above are discussed with reference to use with cellular communications, the systems and methods can be used with other types of wired and wireless communications. In addition, while various functions are discussed as being performed on the UEs 102, 104, 302, 304, 402, 404 and/or on the RCS server 700, other components, such as network entities, could perform the portions, or all, of the same or similar functions without departing from the spirit of the invention. In addition, while the disclosure is primarily directed to UEs 102, 104, 302, 304, 402, 404 sending, receiving, and modifying messages, it can also be used with other devices (e.g., IP network 420 devices, M2M, or IoT devices) on the same, or similar, networks or future networks. Indeed, the systems 400, 500 and methods 100, 200, 300 described herein can be applied to virtually any network that provides SMS, MMS, RSC, or similar types of messaging.

Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A user equipment (UE) comprising:
one or more inputs;
a display;
one or more transceivers to send and receive one or more wired or wireless transmissions;
memory storing at least a messaging application and a message history, the message history including one or more stored messages and one or more message identifications (ID), wherein a message ID of the one or more message IDs is associated with and identifies a stored message of the one or more stored messages; and
one or more processors in communication with at least the one or more transceivers and the memory, the memory including computer-executable instructions to cause the one or more processors to:
receive, at the one or more transceivers, an incoming message from a sender UE including incoming content and an incoming message header;
compare, with the one or more processors, the incoming message header to the one or more message IDs associated with the one or more stored messages stored in the message history;
determine, based on the incoming message header and the one or more message IDs, that the incoming message header includes a repeated message ID that matches the message ID associated with the stored message, wherein the repeated message ID identifies the incoming message and the message ID identifies the stored message for the UE; and
modify, with the one or more processors and based at least on the incoming message header including the repeated message ID, the stored message of the one or more stored messages associated with the message ID.

2. The UE of claim 1, wherein modifying the stored message comprises recalling the stored message by replacing a stored content of the stored message with the incoming content; and
wherein the incoming content comprises a message that the sender UE has recalled the stored message.

3. The UE of claim 2, wherein the incoming content further comprises a time at which the sender UE recalled the stored message.

4. The UE of claim 1, wherein modifying the stored message comprises deleting the stored message by deleting a stored content of the stored message; and
wherein the stored content is no longer displayed and is replaced by the incoming content on the display in a graphical user interface (GUI) of the messaging application.

5. The UE of claim 1, wherein the incoming content includes one or more of text, video, or image content.

6. The UE of claim 1, wherein the message ID associated with the stored message is a Call-ID within a stored message header; and
wherein the repeated message ID associated with the incoming message header is a repeated Call-ID that matches the Call-ID associated with the stored message.

7. A method comprising:
receiving, at one or more inputs of a sender user equipment (UE), an address for a recipient UE and a first content for a first message;
sending, with a transceiver of the sender UE, the first message to the recipient UE including at least the first content and a first message header, the first message header comprising a first message identification (ID);
receiving, at the one or more inputs of the sender UE, a selection of the first message;
receiving, at the one or more inputs of the sender UE, a second content for a second message, the second message to modify the first message;
sending, with the transceiver of the sender UE, the second message to the recipient UE including at least the second content and a second message header, the second message header comprised of a repeated message ID that identifies the second message to the recipient UE and matches the first message ID;
wherein the second message causes, based on the second message header including the repeated message ID, the recipient UE to modify the first message according to the second content of the second message; and
wherein the second content is different from the first content.

8. The method of claim 7, wherein the selection of the first message causes a drop-down menu to appear in a graphical user interface (GUI) of a messaging application on the sender UE; and
wherein the drop-down menu comprises one or more commands to modify the first message.

9. The method of claim 8, wherein receiving the second content for the second message comprises receiving a selection of an EDIT command from the drop-down menu; and
wherein modifying the first message according to the second content of the second message comprises replacing the first content with the second content.

10. The method of claim 8, wherein receiving the second content for the second message comprises receiving a selection of a RECALL command from the drop-down menu;
wherein modifying the first message according to the second content of the second message comprises replacing the first content with the second content; and
wherein the second content includes a message indicating the first message has been recalled.

11. The method of claim 10, wherein the second content further comprises a time at which the first message was recalled.

12. The method of claim 8, wherein receiving the second content for the second message comprises receiving a selection of a DELETE command from the drop-down menu; and
wherein modifying the first message according to the second content of the second message comprises deleting the first message from the messaging application of the recipient UE.

13. The method of claim 7, further comprising:
receiving, with the transceiver of the sender UE, an error message from the recipient UE indicating that the recipient UE is unable to modify the first message.

14. A method comprising:
receiving, at a transceiver of a recipient user equipment (UE), an incoming message including incoming content and an incoming message header;

comparing, with a processor of the recipient UE, the incoming message header to a plurality of messages stored in a message history of the recipient UE;

identifying, based at least on the incoming message header; an incoming message ID that identifies the incoming message for the recipient UE; and determining, with the processor of the recipient UE, that the incoming message ID associated with the incoming message is either:

a repeated message ID that is an identifier associated with a stored message and the incoming message based at least on the incoming message header including a message ID associated with the stored message; or a non-repeated message ID that is not associated with the stored message based at least on the incoming message header not including the message ID associated with the stored message.

15. The method of claim 14, wherein the incoming message is not associated with the stored message, the method further comprising:

displaying, with a display on the recipient UE, the incoming content.

16. The method of claim 14, wherein the incoming message is associated with the stored message, the method further comprising:

modifying, with processor of the recipient UE, the stored message based at least in part on the incoming content.

17. The method of claim 16, wherein the stored message includes stored content;

wherein the stored content comprises a first string of text;

wherein the incoming content comprises a second string of text;

wherein modifying the stored message is based at least in part on the incoming content and comprises replacing the first string of text with the second string of text; and wherein the first string of text is different than the second string of text.

18. The method of claim 16, wherein modifying the stored message comprises recalling the stored message by replacing a stored content of the stored message with the incoming content indicating that a sender UE has recalled the stored message.

19. The method of claim 18, wherein the incoming content further comprises a time at which the sender UE recalled the stored message.

20. The method of claim 16, wherein modifying of the stored message comprises deleting the stored message by deleting a stored content of the stored message; and wherein the stored message is no longer displayed in a messaging application of the recipient UE.

* * * * *